W. B. COWLES.
MOTOR OAR.
APPLICATION FILED AUG. 26, 1912.

1,234,293.

Patented July 24, 1917.
7 SHEETS—SHEET 6.

Witnesses

Inventor
W. B. Cowles,
Attorneys

UNITED STATES PATENT OFFICE.

WILLIAM BARNUM COWLES, OF CLEVELAND, OHIO.

MOTOR-OAR.

1,234,293.      Specification of Letters Patent.      Patented July 24, 1917.

Application filed August 26, 1912. Serial No. 717,149.

*To all whom it may concern:*

Be it known that I, WILLIAM BARNUM COWLES, a citizen of the United States, residing at Cleveland, in the county of Cuyahoga and State of Ohio, have invented certain new and useful Improvements in Motor-Oars; and I do hereby declare the following to be a full, clear, and exact description of the invention, such as will enable others skilled in the art to which it appertains to make and use the same.

The present invention relates to motor oars for small craft, especially canoes, and consists in the combinations and arrangements of parts hereinafter disclosed and particularly set forth in the claims.

The invention has for its purpose to provide a motor oar having the several elements thereof arranged in alinement and in a compact and readily portable unit which is capable of being mounted at different places on the boat, all to the end of convenience for controlling the motor, deriving the maximum efficiency from the propeller, and ease in maneuvering the craft.

The invention further proposes a motor oar which employs an explosive engine as the motive power wherein the starting thereof is effected by a simple and manually actuated device associated with the fly-wheel; wherein the initial and subsequent firings in the cylinder are effected by super-compression of the explosive charges; and wherein the fuel supply system is automatically operable to indicate at periods the amount of fuel on hand.

Another object of the invention consists in maintaining a circulating water system for cooling the motor and shaft bearings, and treating the exhaust gases to reduce back pressure, through a pump and an exhaust turbine associated with the propeller shaft; and by utilizing the suction through said shaft incident to the cavitation produced by the propeller to accelerate the water circulation and further decrease the exhaust back pressure.

Referring to the accompanying drawings forming a part of this specification in which like numerals designate like parts in all the views:—

Referring to the construction in detail, the motor oar comprises (see Figs. 3 and 5) an explosive engine 1 having a supplemental casing of sections 2 and 3 secured to the engine cylinder and crank-shaft casings by bolts 4 and 5, and nuts 6. A sheath tube or shaft 7 for the propeller shaft 8 is secured to the casing section 3, and said sheath shaft is of substantially the length of the propeller shaft and provides the oar arm for maneuvering the craft. The engine flywheel casing 9 is secured by bolts 10 to the crank-shaft casing on the side opposite to the supplemental casing, and has a steering handle 11 mounted thereon in alinement with the maneuvering arm or sheath shaft 7; and a pair of light metal tubes 12 disposed on each side of the engine provide supports for said steering handle and the maneuvering arm and form guards for the motor accessories. Said guard tubes 12 are of semi-circular design and are secured to the cylinder head 13 by brackets 14 mounted on said head, and have their respective ends detachably connected to the steering handle 11 and the casing section 3 by clamping rings 15 and 16, respectively.

The propeller shaft 8 which is of tubular construction (see Fig. 9) has the propeller 17 mounted thereon, and is journaled at its respective ends in the sheath shaft 7 and the supplemental casing (2 and 3) and connects directly with the engine crank-shaft 18 (see Fig. 5) by a slightly flexible and keyed slip joint. Said connection consists (see Figs. 7 and 8) of a pair of keys 19 bedded within key-ways 20 formed in the end of the crank shaft, and fitting within key-ways 21 formed in the extra thickness 22 of an inner reinforcing sleeve 23 on the forward end of the tubular propeller shaft 8. Said keys are seated snugly in the recesses 20 of the crank-shaft and permit of the sleeve 23 of the propeller shaft being easily slipped on or off said keys through the sleeve keyways 21, to couple or un-couple the propeller shaft and crank-shaft. The outer edges and both sides of the keys 19 are curved slightly toward each end which, by reason of the straight sides of the key-ways 21 of the sleeve 23, constitute a flexible joint for relieving the thrust and the propeller shaft bearings from the strains and effects of wear on the crank-shaft and its bearings.

The bearing for the forward end of the propeller shaft 8 (see Figs. 5 and 9) consists of an outer reinforcing sleeve 25 secured to said shaft and fitting within a journal box comprising a pair of thrust collars 26 seated within a chamber 27 of the casing section 2 and holding thrust rings 28 against either side of the annular flange 29 formed on said sleeve 25. Said thrust collars 26 are of substantially conical design and are held in position by a bushing 30 which screw threads into said casing section and is secured therein by a screw 31. A similar bushing 32 screw threads into the casing section 3, and is secured by a screw 33, and both of said bushings 30 and 32 are provided with felt washers or the like 34. The inner and outer reinforcing sleeves 23 and 25 are designed to be "sweated" or brazed on the propeller shaft when of bronze, or electrically welded when constructed of iron or steel; or they may be screwed or riveted on.

The stern bearing for the propeller shaft (see Fig. 9) consists of a Babbitt or lignum-vitæ sleeve 35 interposed between the shaft 8 and the sheath tube 7 just forward of the propeller 17, and is secured to said shaft 8 by a collar 36 having a beveled edge 37, and an outer shaft reinforcing sleeve, 38 having a similar beveled edge 39. Said collar 36 is secured to the propeller shaft 8 by rivets 40 which pass through said collar, the shaft 8, and the inner shaft reinforcing sleeve 41; and the propeller shaft reinforcing sleeves 38 and 41 are secured to the propeller shaft as in that manner stated of the shaft reinforcing sleeves 23 and 25.

Figures 9, 10, 11:
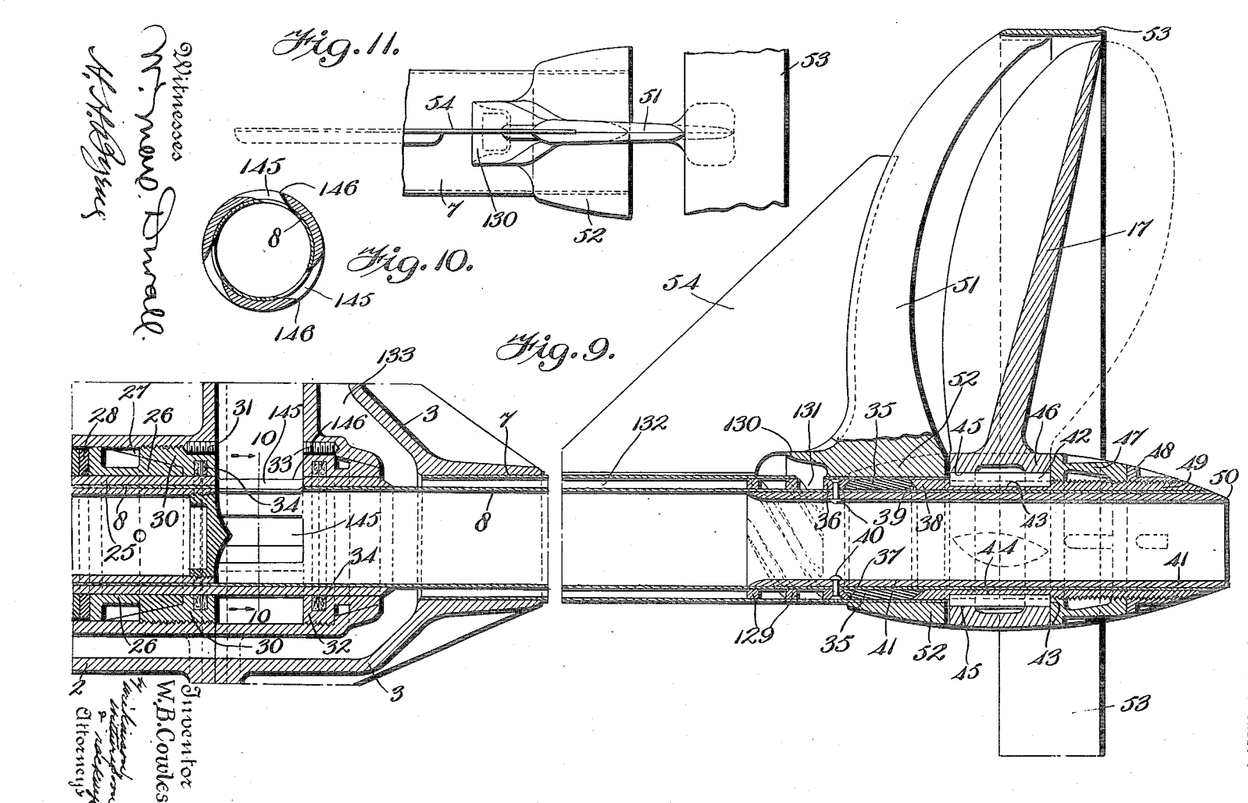
Fig. 9 is a longitudinal sectional view of the rear assembly of the motor oar.
Fig. 10 is a transverse sectional view of the exhaust turbine taken on the line 10—10 of Fig. 9.
Fig. 11 is an elevational view of a detail of the propeller guard and showing one of the water scoops.

The propeller 17 is mounted on the reinforcing sleeve 38 through the medium of keys 42 that fit within key-ways 43 formed in a reduced section 44 of said sleeve, and seat within similar key-ways 45 in the propeller hub 46. A pair of jam nuts 47 and 48 screwed on a threaded portion 49 of the sleeve 38 secure the propeller in keyed position on said sleeve. To remove the propeller it is necessary only to take off the jam nuts 47 and 48 and slip the propeller from off the keys 42, and to remove and renew the bearing sleeve 35, the rivets 40 of the collar 36 are cut and the collar slipped forward when a new bearing sleeve of lignum-vitæ or Babbitt metal is fitted on in halves, and the collar is then replaced and re-riveted.

The jam nuts 47 and 48 and the ends of the propeller hub and inner sleeve 41 together with the shaft 8, are designed with a curved and rearwardly extending taper to produce a fine edge 50 on the propeller shaft whereby the current in the wake of the propeller will cause suction through the propeller shaft for drawing out the exhaust products from the motor as will be further explained.

A propeller guard is mounted on the sheath shaft around the bearing sleeve 35, and comprises a spider legged structure 51 having a hub 52; a guard ring 53 secured to the spider legs, and a plurality of bracket plates or blades 54 secured to the sheath shaft and the spider legs. The guard is constructed of sheet, pressed, or cast metal for lightness and rigidity, and the several parts thereof are united by brazing or electric welding.

The crank-shaft 18 (see Figs. 5 and 15) is journaled in the bushings 55 in the crank-shaft casing, and the fly-wheel 56 is keyed on said crank-shaft in the fly-wheel casing 9, concentric with the steering handle 11 and the propeller and sheath shafts 8 and 7. The steering handle, the motor, and the maneuvering arm, with the propeller shaft and propeller are all disposed in alinement and are mounted as a balanced unit on a universal support adapted for attachment to the side, quarter or stern of the boat, and which permits of the oar having a sweep over an area of 180° for maneuvering, and a relatively great dip in the vertical plane for depth of immersion of the propeller and for quickly lifting the same entirely out of the water.

The oar support comprises a bracket 57 (see Figs. 17 to 19) adapted to be secured in any suitable manner in the boat and having a divided head 58, and a part 59 that projects over the boat rail in the manner shown. A bifurcated bracket arm 60, (see Fig. 17) adapted to swing out-board and in-board of the boat to position or remove the oar, has the members 61 thereof disposed between the bracket side members 57 and the divided head 58, and is mounted on a tubular bolt 62 carried by said bracket. The respective ends of said tubular bolt are provided with a head 63 and a screw-threaded nut 64, and a pair of spring washers 65 on the bolt are disposed between said head and nut and the bracket. The bracket arm is adapted to be secured at different positions when out-board to suit the distance of the rail above water, owing to the varying load on the boat, by means of a locking pin 66 designed to engage within the holes 67 formed in a curved plate section 68 on the bracket arm. Said locking pin has a tapered portion 69 passing through the tubular hinge bolt 62, and an enlarged screw threaded and tapered portion 70 adjustable within the tapered and screw-threaded recess 71 in the bracket head 58. When the locking pin is screwed by its handle 72 to enter the selected aperture 67 of the arm 60, the tapered portions 69 and 70 of the pin act to expand or spread the parts of the bracket head 58 which, with the bolt head 63, nut 64 and spring washers 65, grip or jam said parts against the hinged parts 61 of the bracket arm and hold said arm in place in the selected position of its swing.

A yoke 73 has journaled therein the trunnion pins 74 and 75 carried by the motor casing section 2 (see Figs. 3, 17 and 18) and said yoke is mounted on the bracket arm 60 to give the horizontal sweep to the oar by a swivel pin 76 fitting within an eye at the end of the yoke arm. In order to control the manipulation of the oar in the horizontal sweep the yoke swivel 76 has a threaded end 77 with a nut 78 pinned or cottered thereon, which, with a spring and a plain washer 79 and 80, holds the yoke from jumping and chatter, with just enough friction to allow the yoke to be easily swung by the operator's hand on the steering handle. This is the normal position for maneuvering. When a long run is to be made, the position desired for the yoke can be set and locked by means of a beveled washer 81 fixed to the bracket arm by a pin 82, and which engages with a movable beveled washer 83 having an actuating handle 84. A spring 85 carried by the handle 84 bears against the bracket arm 60 and is adapted to frictionally hold said handle against movement or chatter when the handle is unlocked.

Figure 17:
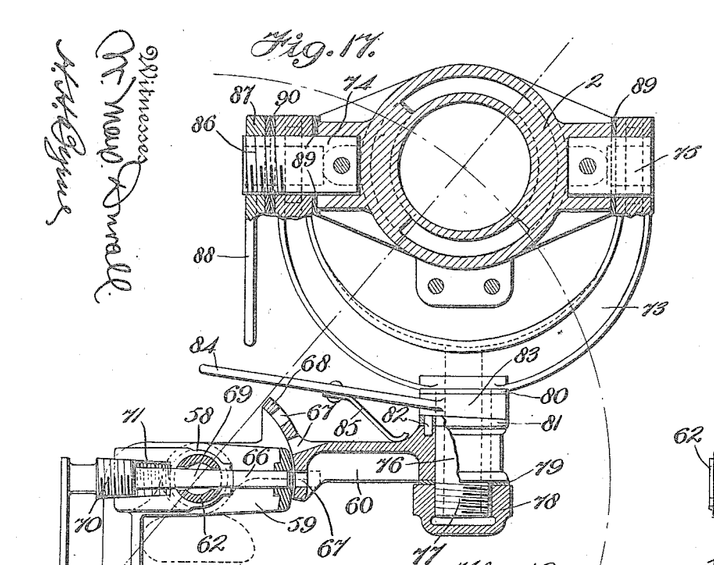
Fig. 17 is a rear elevational view, with parts in section, of the mount for the motor oar.
Figure 18:
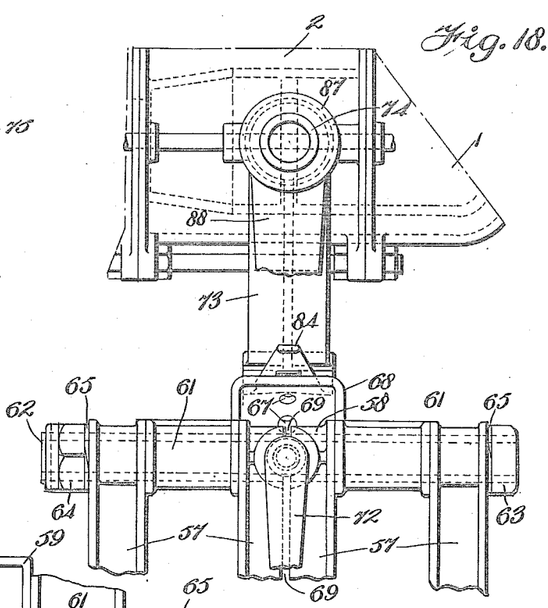
Fig. 18 is a side elevational view thereof.
Figure 19:
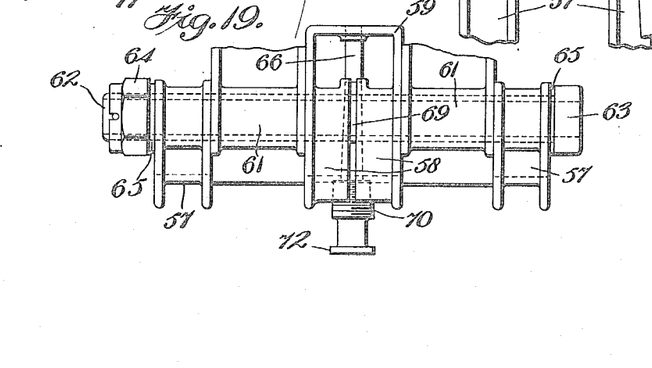
Fig. 19 is a top plan view of the same.

In order to quickly shift, adjust, or clamp the power oar in the vertical plane for depth of immersion of the propeller, the trunnion pin 74 has a threaded extension 86 fitted with a nut 87 having a handle 88. A pair of plain washers 89 and a spring washer 90 are mounted on the trunnion pins to allow the nut 87 to be adjusted so that the spring washer will create just enough friction to hold the trunnion pins in the yoke without chatter or jumping during maneuvering. When it is desired to lock the oar for making a long steady run, the nut 87 may be given the required adjustment merely by a slight turn of the handle 88 when the operator can leave the oar to itself. In ordinary use, however, the frictional adjustment is used, (viz:—elements 74, 75, 89 and 90) when the oar can be set to any desired angle for immersion of the propeller, or for raising the propeller entirely out of the water, as for clearing weeds, rocks, etc., and this may be done instantly with the hand on the oar handle just as with an ordinary oar.

By the means above described, any desired combination of movements of the oar in the horizontal and vertical planes can be had at will, within the limits of sweep planned; also the oar can be locked in any compound angle of these planes desired.

In a power oar, it is necessary to have the supporting bracket secured firmly to the structure of the boat (see Fig. 17), and this bracket may be the same for manufacture to fit the same style of boat, but it must vary in design for various styles of boat and methods of using the power oar. The oar itself remains always the same for manufacture and is intended to be removed and cared for always when not actually in use.

Figures 5, 6, 7, 8:
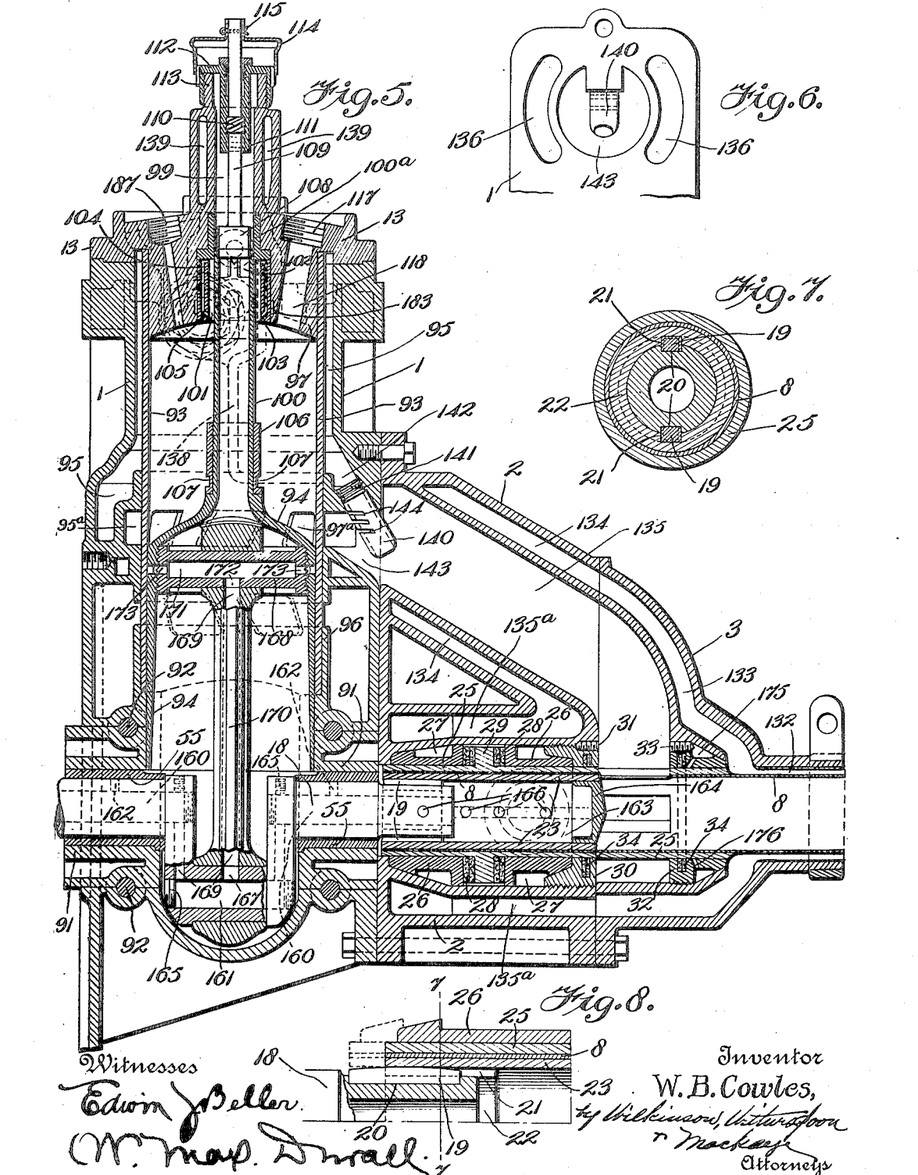
Fig. 5 is a longitudinal sectional view, with parts in elevation, of the engine, and crank shaft and propeller shaft connection.
Fig. 6 is a front elevational view of a face of the engine casing showing the inlet to the cylinder water jacket and the outlet of exhaust.
Fig. 7 is a transverse sectional view of the engine crank shaft and propeller shaft connection taken on the line 7—7 of Fig. 8.
Fig. 8 is a longitudinal sectional view, with parts in elevation, of a detail of said shaft connection.
Figures 12, 13:
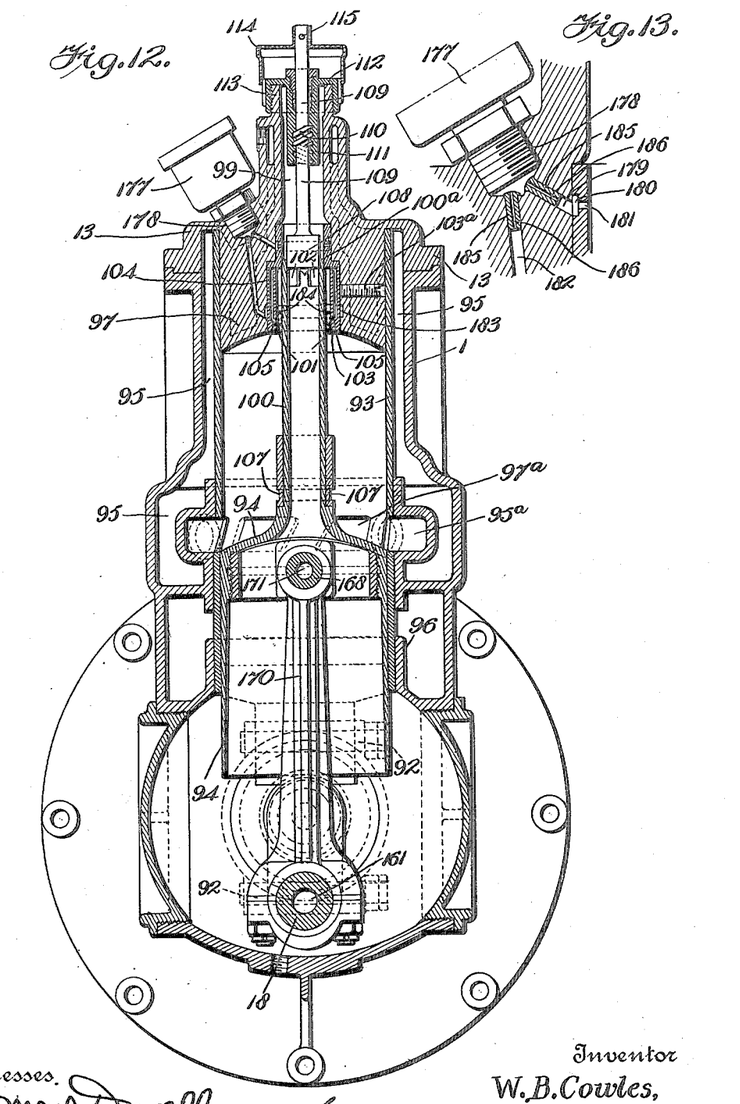
Fig. 12 is a central sectional view of the engine taken at right angles to the view shown in Fig. 5.
Fig. 13 is an enlarged detail view partly in elevation and partly in section of the cylinder lubricator.

The construction of engine and system of ignition is substantially the same as that disclosed in my applications for U. S. Patents, serially numbered 596,157 and 607,114, dated December 7, 1910, and February 17, 1911, respectively. In the construction shown herein, the crank-case and cylinder-case are of one casting (see Figs. 5 and 12)

and the shaft openings in the crank-case are closed with filling bushes 91, carrying the bronze or Babbitt metal bearings 55, and said bushes 91 are securely held in place by taper pins 92, fitting within reamed holes in the crank-casing, thus avoiding the necessity of bolts and flanges.

A sleeve or liner 93 in the casing 1 provides the cylinder for the working piston 94, and the annular chamber 95 for the water jacket. Said liner has one end fitting within an annular flange 96 of the crank-casing, and the other end receiving the head 97 of the casing top 13; and is adapted to take all of the first and direct heat of the explosion, or burning, which enables the cylinder casing to be constructed of very light metal which will not stand said first or direct heat, or wear of the piston, thus greatly reducing the total weight of the motor. The liner 93 has a plurality of openings 97ª communicating with the annular exhaust chamber 95ª formed in the cylinder casing.

The casing top 13 and head 97 are provided with a centrally bored chamber 99, within which operates a trunk piston 100 that is formed integrally and continuous with the main piston 94. Said trunk piston communicates, through the main piston 94, with the crank casing chamber and conducts the carbureted fuel from said chamber to the ignition chamber 101 formed in head 97, said fuel issuing into said chamber through ports 102 in the upper end of the trunk piston 100. The ignition chamber 101 is surrounded by a bushing 103 forming an annular chamber 104 which has ports 105 that extend from its top to a point near its bottom. A second bushing 100ª within which the trunk piston works is mounted in the chamber 99, and is secured by the bushing 103 which is in turn secured by a screw 103ª in the head 97.

An igniting piston 106 carried by the trunk piston 100 is adapted to work within the ignition chamber 101 and compress, in said chamber, to the point of ignition, an isolated portion of the explosive charge taken from the main or explosion chamber. At the instant of such ignition, the annular channel 107 on the piston 106 comes into register with the lower ends of ports 105 and brings said ports into communication with the main explosion chamber when the flame incident to the ignition is liberated into said main explosion chamber and ignites the main charge which is then under compression by the main piston.

The flow of explosive mixture from the crank casing into the main explosion chamber is adapted to be throttled by a valve or plug 108, carried by a rod 109, that has a screw portion 110 adjustably mounted in the threaded portion of a projection 111 on a cover 112, that screws onto an extension 113 of the casing top 13. A cap 114 secured to the rod 109 by a pin 115 serves for adjusting the valve 108.

An important quality of this design lies in the fact that when the motor is run up to a speed which would ordinarily cause the motor to "choke" (i. e., slow down and perhaps stop because of the impossibility of getting the scavenging done and enough clean mixture let in, in time to get a good explosion), the present motor will still get perfect mixture for explosion because the mixture enters and sweeps out the firing cylinder first, and this cylinder, together with the top of the main cylinder, always has clean mixture, even when the speed is so great that the lower end of the main cylinder cannot clean itself during the time the exhaust ports are open.

The initial firing of the motor is effected by a hand firing plug 116 (see Fig. 3) that screws into a threaded opening 117 in the casing top 13 (see Fig. 5), and has communication with the main explosion chamber through the port 118. The plug is designed to withdraw and isolate from the explosive chamber a relatively small portion of the compressed charge, compress this portion by loaded impact to effect ignition, and then liberate within the charged chamber the flame incident to the explosion. For a further description of the construction and manner of operation of the firing device, reference may be had to my application for U. S. Patent bearing the Serial No. 607,113 and dated February 7, 1911. An electric spark plug or other electric sparking device can be screwed into the threaded opening 117 if desired.

The fuel supply is contained in a tank 119 (see Figs. 3 and 4), that is capable of being set in different positions for automatically indicating at intervals the amount of fuel on hand. Said tank is pivotally connected to lugs 120 on the cylinder casing 1, and is adjustably secured to and between the guard tubes 12 by a pair of arms 121. The arms 121 are pivotally connected to the tank, at 122, and have engagement with clamps that are slidably mounted on said guard tubes 12. The adjusting clamps consist each of a part 123, that is slidably mounted on the tube 12, and a similar part 124, at right angles thereto, having an opening through which the arm 121 passes; and a thumb screw 125 threaded in the part 124, together with the block 125ª, serves for securing the tank in different adjusted positions. It is contemplated to use only one thumb screw for setting the tank in different adjusted positions, viz:—the screw on the inboard side, but when there is considerable surge on the tank both thumb screws may be used.

Figure 1:
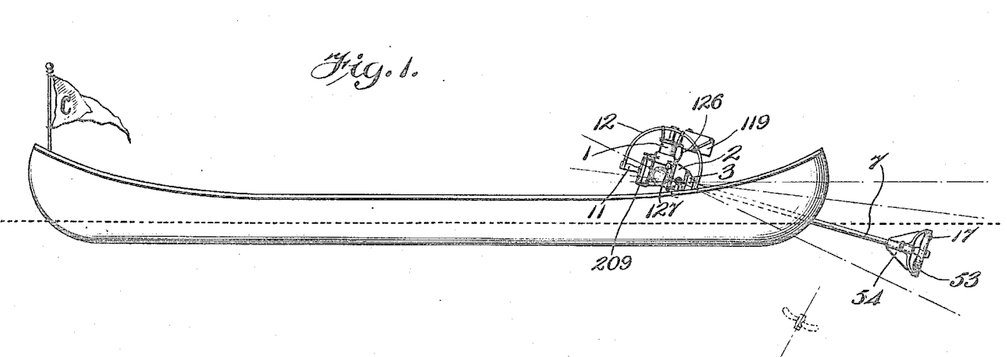
Figure 1 is a side elevational view of the motor oar mounted on a canoe.
Figure 2:
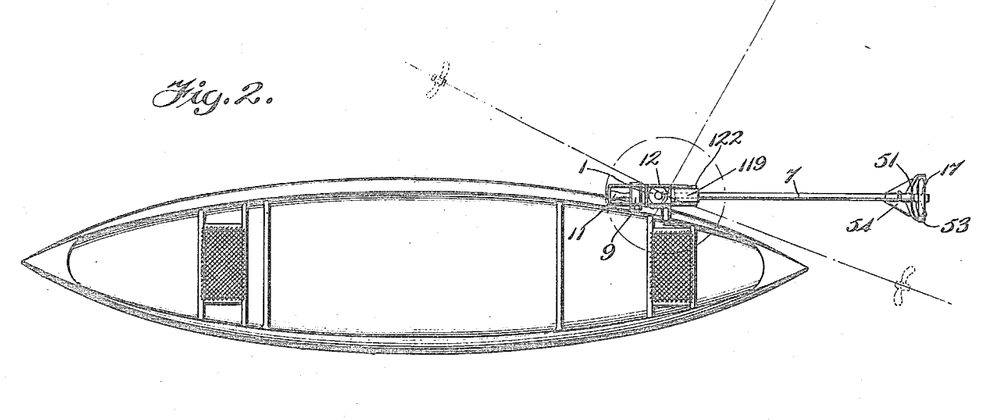
Fig. 2 is a top plan view of the same.
Figures 3, 4:
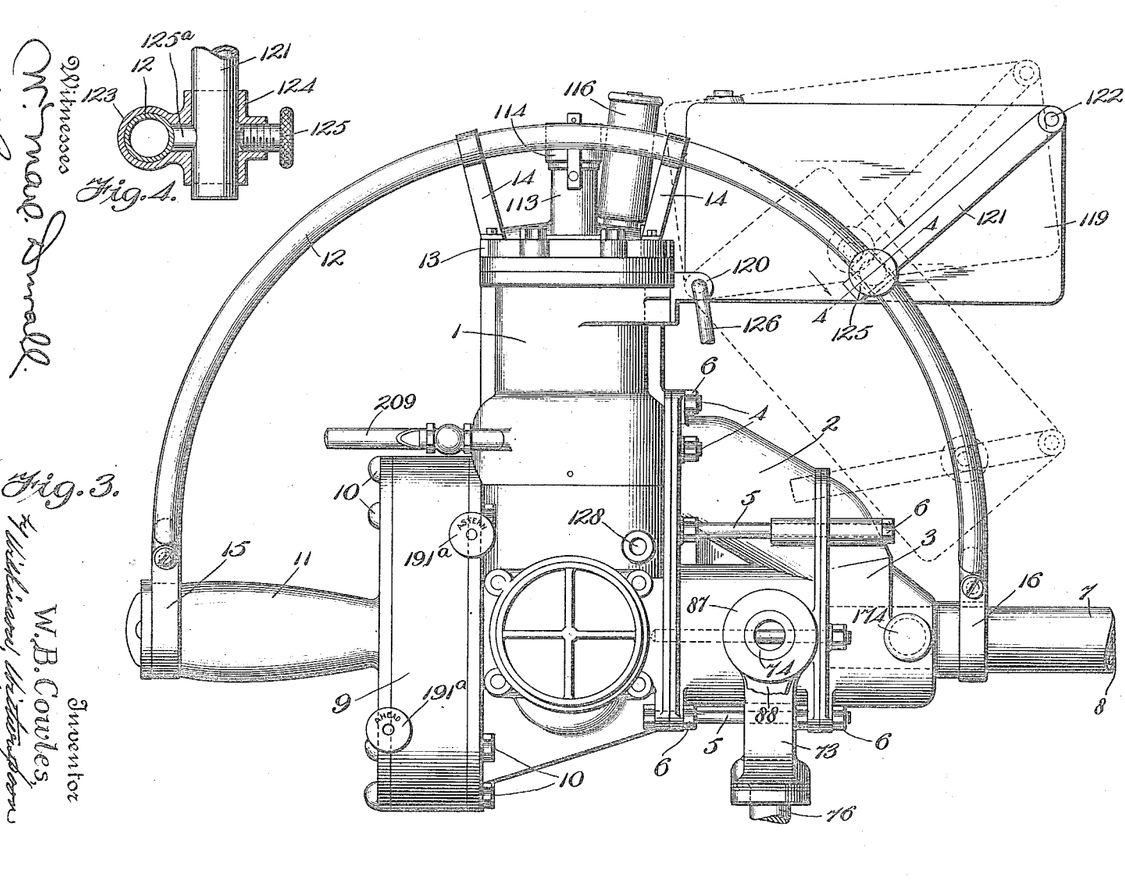
Fig. 3 is a side elevational view of the forward assembly of the motor oar.
Fig. 4 is an enlarged detail sectional view taken on the line 4—4 of Fig. 3 of the clamp for adjustably securing the fuel tank.

A feed pipe 126 connects the fuel tank with the carbureter 127 (see Figs. 1 and 3)

that is mounted on the crank casing and communicates with the chamber thereof through the opening 128.

From the foregoing, it will be seen that when the tank is set to its lowest position (indicated in Fig. 3) and which is the proper position at the beginning of a run, the fuel would feed through the pipe 126 to the carbureter only until the level of the fuel reached approximately the horizontal plane passing through the inlet opening of said pipe, and at this point the motor would commence to "miss" for failure to get an explosive charge. This would indicate to the operator that the fuel tank needed to be adjusted. When the tank, after adjustment to a higher position, has its contents again used down to the level of the feed pipe inlet, the automatic signal is given by the "missing" of the motor, and the operator again adjusts the tank to a higher position. In this way, the operator can always have an approximate measure of the fuel in the tank, and an automatic reminder as this amount decreases. This is not only of great convenience at all times in the use of the oar, but it may easily be of vital importance for safety in finishing a run and getting to a certain point where a fresh supply of fuel is obtainable.

The circulating water system for cooling the motor, thrust and line shaft bearings; and treating the exhaust gases, employs a pump operated by the propeller shaft for feeding the water and utilizes the "cavitation" created by the propeller for accelerating its flow, and further reducing the exhaust back pressure. The pump consists (see Figs. 9 and 11) of spiral threads 129 on the propeller shaft that receive the water deflected by the scoops 130 through the openings 131 in the sheath shaft, and force said water through the annular space 132 between the sheath and propeller shafts. The water scoops 130 are constructed integral with the spider legs 51 of the propeller guard, and the threads 129 of the spiral pump are formed with the collar 36 secured on the propeller shaft.

The water passes from the annular space or channel 132 (see Fig. 5) into the water jacket 133 of the casing section, or exhaust cap, 3, and then enters the water jacket 134 of the casing section 2 which surrounds the exhaust passage 135, and into the space 135$^a$ surrounding the thrust and line shaft bearings. From the chamber 134 the water enters, through the passageways 136, (see Fig. 6) the cylinder water jacket 95 at that part surrounding the cylinder exhaust chamber 95$^a$. It then passes upwardly through the forward portion of the cylinder water jacket, being deflected by a web 138, through the space 139 in the casing top (see Figs. 5 and 12), and then down the after portion of the cylinder water jacket, and out through the ejector 140. This ejector consists of a small tubular piece having a threaded end 141, that screws into an opening 142 formed in the cylinder casing adjacent the exhaust chamber outlet 143. A series of slots or saw-cuts 144 are formed in that side of the ejector facing said outlet, and are adapted to receive portions or jets of the issuing exhaust gases, which "shoot" through and "sweep" the circulating water out of the ejector, through the exhaust passageway 135. This spraying and mixing of the exhaust products causes the same to be condensed and consequently decreases the back pressure on the engine. The mixed and sprayed circulating water and exhaust products then pass from the exhaust chamber and exhaust cap through the exhaust turbine (see Figs. 5, 9 and 10) thence out through the tubular propeller shaft 8, and are discharged just abaft the propeller.

The exhaust turbine (see Figs. 9 and 10) consists of a plurality of holes or apertures 145 formed in propeller shaft 8, and its outer reinforcing sleeve 25, and said openings are disposed tangentially to the shaft and are flared outwardly. The edges 146 of the openings are sharply beveled and act to draw in the mixture of water and gases when the propeller shaft is revolving "ahead."

It will thus be seen that the circulating water is forced on its passage first by the scoops 130, then by the spiral pump 129, then by the exhaust ejector 140, and finally by the exhaust turbine. At high speeds, there is still another force acting to finally "pull out" the mixture of water and exhaust products from the propeller shaft, and thus still further reduce the back pressure as well as increase the water circulation; viz:— what is known as "cavitation." This consists of a partial vacuum created in the water immediately behind and at the center of the propeller, and this condition increases as the speed increases so that in extreme cases there is an actual "hole" in the water immediately following the screw. This action of "cavitation" is a well known cause of deficiency in screw propellers when turning at high speeds, and it is proposed to utilize this defect in two ways; viz:—to fill the "cavitated" hole full of the exhaust mixture (under whatever pressure remains in it when it reaches the end of the propeller shaft) and thus help the efficiency of the propeller; and secondly to give the exhaust mixture a further outward impulse and still further decrease the back pressure. This method of utilizing the "cavitation" will also materially decrease the noise of the exhaust entering the water and will, in fact, act in the very desirable capacity of a silencer.

In addition to its function of cooling the motor and condensing the exhaust gases, it is to be noted that the circulating water cools the oar from the motor to the propeller, and incidentally it will be seen that in all this length of the oar, there is not a point where the exhaust is exposed, through a metal surface, to burn the hands of the operator.

The lubricating system comprises a force feed lubricator (see Figs. 3 and 15) mounted in the steering handle 11, and consists of a case 147 that fits within the handle and has screw-threaded engagement therewith, as at 148. A screw 149 is journaled in the head 150 of the case 147 between a collar 151 secured on the screw within the case, and a wing nut 152 secured on the outer end of said screw. A piston nut 153 is adjustably mounted on the screw 149, and has a tubular extension 154 on which is movably mounted a plunger or follower 155 having a washer 156, and the end 157 of the tubular extension is enlarged or flared to prevent the plunger 155 from coming off. A spring 158 is interposed between the piston nut 153 and the plunger 155, and normally acts against the plunger to compress the lubricant within the chamber 159 of the case and force the same through the passage 160 in the crank shaft 18. As the grease is used, the spring 158 pushes the plunger 155 aft until said plunger is stopped by the enlarged end 157 of the tubular extension, when no more grease will feed until the screw 149 is turned to adjust the plunger 155 further aft. By a succession of these adjustments of the plunger all of the lubricant contained within the chamber 159 is consumed. The case 147, with the several members contained therein, is adapted to be removed bodily and filled with the lubricant when desired.

The grease passes from the forward end of the crank shaft through the crank shaft and crank passages 160 and 161 (see Fig. 5), lubricating the line shaft bearings 55 through holes 162, and then enters and fills the chamber 163 provided by the forward and inner shaft reinforcing sleeve 23. A cap 164 closes the rear end of the chamber 163; and screw plugs 165 close the ends of the holes forming the passage 161 through the crank.

The propeller line shaft and thrust bearings are lubricated by the grease from the chamber 163, which feeds through the holes 166; and the piston, piston rod, etc., are lubricated from the grease passage 161 in the crank pin. The crank pin has a hole 167 that feeds the crank pin bearing, and also feeds the bearing of the wrist pin 168 through the passage 169 drilled through the length of the piston rod 170, and said wrist pin has a passage 171 that receives the grease from the connecting rod passage 169 through the hole 172, and from said passage 171 the lubricant is fed through the ducts 173 to the wall of the cylinder and the inner surface of the liner 93.

The tube shaft bearing 32 in the exhaust cap 3 is lubricated by the grease contained in a grease cup 174 that is mounted on said cap, as shown in Fig. 3. Said grease feeds from the cup into the annular chamber 175 (see Fig. 5) and thence through ducts 176 to the shaft bearing.

The lubrication of the firing and trunk pistons is accomplished by a grease cup 177 (see Figs. 12 and 13) that screws into a threaded opening 178 in the casing top 13, and from said cup the grease flows through the passage 179 into an annular space 180 surrounding the bushing 100$^a$, thence through the ducts 181 to the inner surface of the bushing and the outer wall of the trunk piston. A second passage 182 feeds the lubricant from the cup to an annular space 183, and thence through ducts 184 to the inner surface of the firing bush. The two passages 179 and 182 are provided with small plugs 185 having each a fine hole 186 therethrough, adapted to retard the flow of grease or oil.

The lubrication of the after bearing of the propeller shaft is the same as that used on big steamers, viz:—by a lignum-vitæ sleeve (35) to which the water has access. A screw-threaded opening 187 in the cylinder head (see Fig. 5) is adapted to receive a priming cock for lubricating the cylinder.

The engine starting and reversing device consists of a pair of "spinners" for manually turning the fly-wheel in the forward or reverse direction to impart the initial strokes to the piston. The object is to provide a means for spinning the motor several revolutions and which shall be "fool-proof" and automatically release itself from the fly-wheel as soon as the explosion takes place in either direction and whether the actuating member is released or not, and since the construction of both "spinners" is identical only one need be described (see Figs. 14, 15 and 16).

A wheel or cord disk 187$^a$ is mounted to rotate freely on the hub 188 formed by an inward and annular extension of the fly wheel casing, and a cord 189 of fine metal strands is wound in the peripheral groove 190 of said disk and has one end secured thereto. The other end of the cord passes through a hole 190$^a$ in the fly-wheel casing and is provided with a pulling button 191$^a$ (see Fig. 3). A second wheel or spring-disk 191 is also journaled on the hub 188, and has an outer segmental flange 192 disposed against the hub of the cord disk 187$^a$, as clearly shown in Fig. 15. A volute spring 193 is located between the cord-disk and spring-disk, and is adapted to turn said cord-disk to re-wind the cord 189 after the same has been pulled to rotate the fly-wheel, as will be presently explained. Said spring has its inner end 194 hooked and secured to the stationary bearing 188, and its outer end portion 195 is thinned down for greater flexibility and connects with the fly-wheel engaging and releasing element. Said element consists of a link 196, which swings on a pin 197 that is either riveted to the spring-disk 191, or slides within a radial slot 198 formed therein. A triangular plate 199, providing a trigger, is mounted on a pivot pin 200 carried by the free end of the link 196, and a pair of projections in the form of pins 201 and 202 are rigidly secured to and carried by said trigger plate. The pin 202 works within a radial slot 203 in the cord-disk 187ª and acts to move the trigger point 204 (when the cord-disk is turned) into engagement with the teeth of the ratchet 205 formed on the inner periphery of the fly-wheel 56. The trigger point 204 is normally held out of engagement with said ratchet, and released from engagement therewith in the operation of the device, by the spring flattened end portion 195. Said spring portion engages with the outside of an extension 206 of the radially movable pin 202 and the inside of the pin 201, and has its extreme end 207 secured to the link pivot pin 197.

The operation is as follows:—

Figure 14:
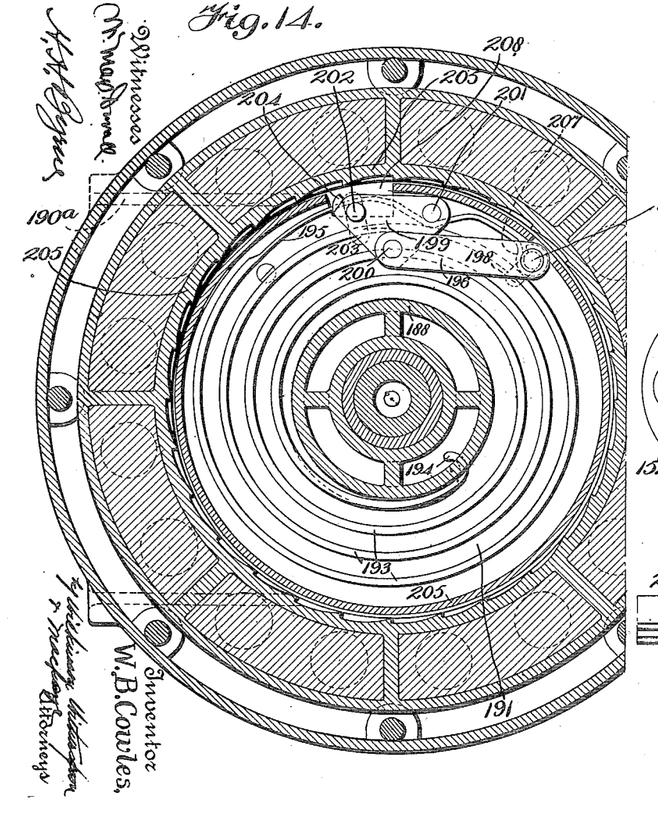
Fig. 14 is a transverse sectional view, taken on line 14—14 of Fig. 15 and looking in the direction of the arrows, of the engine starting devices.
Figures 15, 16:
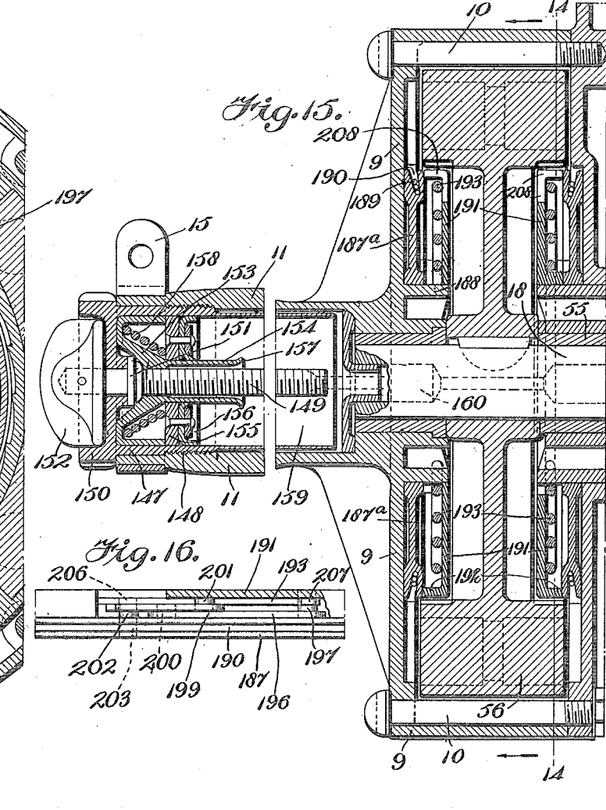
Fig. 15 is a central sectional view thereof, and shows the force feed lubricator.
Fig. 16 is a top plan view of the engaging and releasing elements of the starting devices.

The motor is at rest, the fuel supply is on, and compression firing or any other firing being used. The proper cord is sharply pulled out about twelve or eighteen inches by grasping the button between the first and second fingers and giving a straight pull. This will cause two or three revolutions of the fly-wheel which will be sufficient to charge the cylinder and spark, or fire once or twice. The rotation of the cord-disk 187ª will, by its radial slot 203 acting with the trigger pin 202, cause the trigger 199 to swing on its pivot 200 and the trigger point 204 to move, outwardly through the opening 208 in the spring-disk flange 192, and engage with the fly-wheel ratchet 205. Then the fly-wheel, cord-disk, spring-disk and trigger mechanism will revolve as a unit and the spring will be compressed or wound up from the outside. The instant the cord is released the spring reverses the movement of all parts except the fly-wheel, and pulls them back to normal.

The fly-wheel is left free to go on revolving in the direction pulled, and so long as it goes in that direction the teeth cannot catch on or otherwise interfere with the trigger. Should the motor get an impulse in the reverse direction, for any reason, no breaking or harm can result as the trigger point is pressed back, and down since the trigger pin 202 will slide inwardly in the slot 203. The trigger can also be pressed in toward the center bodily due to its being hung on the pivoted link 196.

The exhaust gases from the motor may be used as a signaling device for the craft and to that end a whistle 209 of any suitable type is mounted on the cylinder casing (see Fig. 3) and receives the exhaust gases from the chamber 95.

It is obvious that those skilled in the art may vary the details of construction and arrangement of parts without departing from the spirit of my invention, and therefore I do not wish to be limited to such features except as may be required by the claims.

What I claim is:—

1. The combination with a boat of a motor oar therefor comprising a motor; a propeller shaft connected to the motor; a propeller on said shaft; a universal support for the motor; a steering handle mounted on the motor; and a mount for the motor support adapted for bodily swinging said support inboard or outboard of the boat, substantially as described.

2. The combination with a boat of a motor oar therefor comprising a motor; a propeller shaft connected to the motor and disposed alongside the boat; a propeller on said shaft; and means for mounting the motor on the boat and swinging the same inboard and outboard transversely of the boat, substantially as described.

3. The combination with a boat of a motor oar therefor comprising a motor; a universal support for the motor; a fulcrumed mount for said support on the boat and adapted for swinging the motor inboard and outboard thereof; a propeller shaft connected to the motor; a propeller on said shaft; and a steering handle mounted on the motor, substantially as described.

4. The combination with a boat of a motor oar therefor comprising a motor; a propeller shaft connected to the motor; a propeller on said shaft; a universal support for the motor; an adjustable mount for said support removably secured to the boat; and means for adjusting the elevation of said mount, substantially as described.

5. The combination with a boat of a motor oar therefor comprising a motor; a propeller shaft connected to the motor; a propeller on said shaft; a universal support for the motor; a bracket secured to the boat; an arm swingingly mounted on said bracket, said universal support mounted on the bracket arm; and means for adjusting and holding the bracket arm at different elevations, substantially as described.

6. The combination with a boat of a motor oar therefor comprising a bracket adapted to be secured to the boat; an arm swingingly mounted on said bracket; a device for holding said arm in different elevated positions; a yoke swiveled on said arm; a device for securing said yoke in different lateral positions; a motor having horizontal trunnions journaled on said yoke; a device for securing said trunnions at different set positions; a propeller shaft connected to the motor; and a propeller on said shaft, substantially as described.

7. The combination with a boat of a motor oar therefor comprising a bracket adapted to be secured to the boat; an arm swingingly mounted on said bracket and having an apertured arcuate section; a screw-adjustable pin mounted on said bracket and adapted to engage with said arcuate section for holding the arm in different elevated positions; a yoke swiveled on said arm; a jam locking device for securing said swiveled yoke in different positions; a motor having horizontal trunnions journaled on said yoke; a jam locking device for securing said trunnions at different set positions; a propeller shaft connected to said motor; and a propeller on said shaft, substantially as described.

8. The combination with a boat of a motor oar therefor comprising a support mounted on the boat; a yoke swiveled on said support; a motor having horizontal trunnions journaled on said yoke; a spring washer for placing uniform friction on said trunnions; a device for securing said trunnions in different set positions; a propeller shaft connected to the motor; and a propeller on said shaft, substantially as described.

9. The combination with a boat of a motor oar therefor comprising a support mounted on the boat; a yoke swiveled on said support; a spring washer for placing uniform friction on the yoke swivel; a device for securing the yoke swivel in different set positions; a motor having horizontal trunnions journaled on said yoke; a device for securing said trunnions in different set positions; a propeller shaft connected to the motor; and a propeller on said shaft, substantially as described.

10. The combination with a boat of motor oar therefor comprising a bracket secured to the boat; an arm hingedly mounted on said bracket; a spring washer on said hinge mount for placing uniform friction on said bracket arm; a universal support mounted on said bracket arm; a motor mounted on said support; a propeller shaft connected to the motor; and a propeller on said shaft, substantially as described.

11. In a motor oar, the combination with a tubular propeller shaft having a propeller mounted thereon and a sheath shaft exterior to said propeller shaft; of an inner reinforcing sleeve secured in the after end of the propeller shaft; a fixed hub secured to the after end of the sheath shaft and containing the after bearing of the propeller shaft, and an outer reinforcing sleeve fixed to the after end of the propeller shaft and forming the after journal of said propeller shaft, substantially as described.

12. In a motor oar, the combination of a motor having a fly-wheel; a motor casing inclosing the fly-wheel; a propeller shaft connected to the motor; a propeller on said shaft; a propeller sheath shaft secured to the motor casing; a steering handle secured to the fly-wheel casing; and a guard and supporting bar secured to the motor casing, the propeller sheath shaft, and the steering handle, substantially as described.

13. In a motor car, the combination of a motor having a fly-wheel; a motor casing inclosing the fly-wheel; a propeller shaft connected to the motor; a propeller on said shaft; a propeller sheath shaft secured to the motor casing; a steering handle secured to the fly-wheel casing; and a pair of tubular guard and supporting bars secured to the motor casing, the propeller sheath shaft, and the steering handle, substantially as described.

14. In a motor oar, the combination with a tubular propeller shaft having a propeller mounted thereon, and a sheath shaft exterior to said propeller shaft, of a fixed hub secured to the after end of the sheath shaft and containing the after bearing of the propeller shaft, and an outer reinforcing sleeve fixed to the after end of the propeller shaft and forming the after journal of said propeller shaft, substantially as described.

15. In a motor oar, the combination with a motor; a propeller shaft connected to the motor; a propeller on said shaft; and accessories for said motor and propeller shaft, of guard and supporting bars for said motor and accessories; and a fuel supply tank adjustably mounted on said bars, substantially as described.

16. In a motor oar, the combination with a motor; a propeller shaft connected to the motor; a propeller on said shaft; and accessories for said motor and propeller shaft, of guard and supporting bars for said motor and accessories; and a fuel supply tank swingingly mounted on the motor and adjustably supported by said bars, substantially as described.

17. In a motor oar, the combination of a motor having a fly-wheel; a motor casing inclosing the fly-wheel; a propeller shaft connected to the motor; a propeller on said shaft; a propeller sheath shaft secured to the motor casing; a steering handle secured to the fly-wheel casing, a pair of guard and supporting bars secured to the motor casing, the propeller sheath shaft, and the steering handle; and a fuel supply tank swingingly mounted on the motor casing and adjustably supported by said bars, substantially as described.

18. In a motor oar, the combination of a motor having a fly-wheel; a motor casing inclosing the fly-wheel; a propeller shaft connected to the motor; a propeller on said shaft; a propeller sheath shaft secured to the motor casing; a steering handle secured to the fly-wheel casing; a pair of guard and supporting bars secured to the motor casing, the propeller sheath shaft, and the steering handle; a fuel supply tank swingingly mounted on said motor casing; and a pair of arms mounted on said fuel tank and adjustably supported on said bars, substantially as described.

19. In a motor oar, the combination of an explosive engine having a water jacket; a tubular propeller shaft connected to the engine; a propeller on said shaft; and a sheath shaft for said propeller shaft, said shafts communicating and providing a water circuit with said water jacket, substantially as described.

20. In a motor oar, the combination of an explosive engine having a water jacket; a tubular propeller shaft connected to the engine; a propeller on said shaft; a sheath shaft for said propeller shaft, said shafts communicating and providing a water circuit with said water jacket; and means on said propeller shaft for forcing water through said circuit, substantially as described.

21. In a motor oar, the combination of an explosive engine having a water jacket; a tubular propeller shaft connected to the engine and providing an exhaust outlet for the explosive chamber and the water jacket; a propeller on said shaft; and a sheath shaft for the propeller shaft providing a water inlet for the water jacket, substantially as described.

22. In a motor oar, the combination of an explosive engine having a water jacket; a tubular propeller shaft connected to the engine and providing an exhaust outlet for the explosive chamber and the water jacket; a propeller on said shaft; a sheath shaft for the propeller shaft providing a water inlet for the water jacket; and means on said propeller shaft coöperable with the engine exhaust for effecting water flow through said shafts and the water jacket, substantially as described.

23. In a motor oar, the combination of an explosive engine having a water jacket; a tubular propeller shaft connected to the engine and providing an outlet for the water jacket; a propeller on said shaft; a sheath shaft for the propeller shaft providing an inlet for the water jacket; and means associated with said propeller shaft for pumping water through said water jacket, substantially as described.

24. In a motor oar, the combination of an explosive engine having a water jacket; a tubular propeller shaft connected to the engine and providing an outlet for the water jacket; a propeller on said shaft; a sheath shaft for the propeller shaft providing an inlet for the water jacket; and a scoop on said sheath shaft for feeding water to said water jacket, substantially as described.

25. In a motor oar, the combination of an explosive engine having a water jacket; a tubular propeller shaft connected to the engine and providing an outlet for the water jacket; a propeller on said shaft; a sheath shaft for the propeller shaft providing an inlet for the water jacket; and a scoop and worm and turbine on said shafts for feeding and pumping water through and out of said water jacket, substantially as described.

26. In a motor oar, the combination of an explosive engine having a water jacket; a tubular propeller shaft connected to the engine and providing an outlet for the water jacket; a propeller on said shaft; a sheath shaft for the propeller shaft providing an inlet for the water jacket; and a guard for the propeller mounted on said sheath shaft and constructed to provide a scoop for feeding water to said water jacket, substantially as described.

27. In a motor oar, the combination of an explosive engine having a casing; a supplemental casing secured to the engine casing; said casings providing a water jacket; a sheath shaft mounted on the supplemental casing and providing an inlet for the water jacket; a tubular propeller shaft connected to the engine and journaled in said sheath shaft and the supplemental casing and providing a water outlet for the water jacket; and a propeller on said propeller shaft, substantially as described.

28. In a motor oar, the combination of an explosive engine having a crank shaft and a casing; a supplemental casing secured to the engine casing and providing an exhaust outlet for the cylinder; said engine casing and supplemental casing providing a water jacket communicating with said exhaust outlet; a sheath shaft mounted on the supplemental casing and providing an inlet for the water jacket; a tubular propeller shaft connected to the crank shaft and journaled in said sheath shaft and the supplemental casing, said propeller shaft communicating with the exhaust outlet of the supplemental casing and providing an outlet for the exhaust gases and the water jacket; and a propeller mounted on said propeller shaft, substantially as described.

29. In a motor oar, the combination of a motor having a casing and a shaft; a tubular propeller shaft; a propeller on the propeller shaft; an inner reinforcing sleeve on the tubular propeller shaft; a slip joint and a flexible connection between said sleeve and the motor shaft; and an outer reinforcing sleeve on the propeller shaft journaled in the motor casing, substantially as described.

30. In a motor oar, the combination of a motor having a casing and a shaft with a reduced portion provided with key-ways; a tubular propeller shaft journaled in the casing; a propeller on the propeller shaft; an inner reinforcing sleeve on the tubular propeller shaft provided with key-ways; and keys, having inclined side edges, fitting within said key-ways and providing a slip joint and a flexible connection between said shafts, substantially as described.

31. In a motor oar, the combination of a motor having a casing and a shaft provided with key-ways; a tubular propeller shaft; a propeller on the propeller shaft; an inner reinforcing sleeve on the propeller shaft provided with key-ways; keys, having inclined end portions, fitting within said key-ways and providing a slip joint and flexible connection between said shafts; and an outer reinforcing sleeve on the propeller shaft journaled in the motor casing, substantially as described.

32. In a motor oar, the combination of a motor having a casing and a shaft; thrust bearings mounted in the casing; a tubular propeller shaft journaled in said thrust bearings; a propeller on the propeller shaft; an inner reinforcing sleeve on the propeller shaft at said thrust bearing; and a slip joint and flexible connection between the motor and propeller shafts, substantially as described.

33. In a motor oar, the combination of a motor having a casing and a shaft; a tubular propeller shaft; a propeller on the propeller shaft; thrust bearings in said casing; an outer reinforcing sleeve on the propeller shaft and journaled in the thrust bearings; an inner reinforcing sleeve on the propeller shaft; and a slip joint and flexible connection between the motor and propeller shafts, substantially as described.

34. In a motor oar, the combination with a motor; a sheath shaft; and a propeller shaft in the sheath shaft connected to be driven by the motor, of a collar, and a reinforcing sleeve with a propeller secured on said propeller shaft; and a sleeve bearing disposed between the sheath and propeller shafts, and secured to the latter by said collar and hub, substantially as described.

35. In a motor oar, the combination with a motor; a sheath shaft; and a propeller shaft in the sheath shaft connected to be driven by the motor, of a collar riveted on the propeller shaft; a reinforcing sleeve with a propeller mounted on the propeller shaft; and a sleeve bearing disposed between the sheath and propeller shafts; and secured to the propeller shaft by said collar and reinforcement, and said collar adapted to be moved axially on the propeller shaft to remove and renew said sleeve bearing, substantially as described.

36. In a motor oar, the combination with a motor; and a tubular propeller shaft connected to be driven by the motor, of an inner reinforcing sleeve for the shaft; an outer reinforcing sleeve secured on the shaft; a propeller keyed on said outer reinforcement; and a jam nut on the outer reinforcement securing said propeller in keyed position, substantially as described.

37. In a motor oar, the combination with a motor; and a tubular propeller shaft connected to be driven by the motor, of an inner reinforcing sleeve for the shaft; an outer reinforcing sleeve brazed or welded on the shaft; a propeller keyed on said outer reinforcement; and jam nuts screwed on said outer reinforcement and securing the propeller in keyed position, substantially as described.

38. In a motor oar, the combination with a motor; a tubular propeller shaft; and a tubular sheath shaft for the propeller shaft, of an inner reinforcing sleeve for the propeller shaft; a collar and an outer reinforcement secured on the propeller shaft; a bearing sleeve secured on the propeller shaft by said collar and outer reinforcement; a propeller keyed on the outer reinforcement; and jam nuts screwed on the outer reinforcement and securing the propeller in keyed position, substantially as described.

39. In a motor oar, the combination with a motor; a tubular propeller shaft; and a tubular sheath shaft for the propeller shaft, of an inner reinforcing sleeve for the propeller shaft; a collar riveted on the propeller shaft; an outer reinforcement welded or brazed on the propeller shaft, said collar and outer reinforcement having adjacent beveled edges; a lignum-vitæ bearing sleeve secured on the propeller shaft between the beveled edges of said collar and outer reinforcement; and a propeller mounted on the propeller shaft, substantially as described.

40. In a motor oar, the combination with a motor having a crank shaft and a casing; line and thrust bearings in said casing; a propeller shaft journaled in said bearings and connected to said crank shaft; a propeller; and a steering handle mounted on the casing; of lubricating means comprising a force feed lubricator located in said handle and communicating by passageways with the motor and the shaft bearings, substantially as described.

41. In a motor oar the combination with a motor having a crank shaft and a casing; line and thrust bearings in said casing; a propeller shaft journaled in said bearings and connected to said crank shaft; a propeller; and a steering handle mounted on the casing; of lubricating means comprising a force feed lubricator located in the steering handle and communicating by passageways with the motor; and a lubricant holding chamber located in the end of the propeller shaft and adapted to be supplied from said passageways, and lubricant passages from said chamber to the propeller shaft, line and thrust bearings, substantially as described.

42. In a power oar, the combination of a crank-case and cylinder-case constructed in one casting; a section providing an exhaust chamber; a section providing an exhaust cap; bolts detachably securing said sections with the cylinder and crank casing; a piston; a crank-shaft connected to the piston, a propeller shaft connected to said crank shaft; and a propeller mounted on said propeller shaft; substantially as described.

43. In a motor oar, the combination of an explosive engine having a water jacket, a tubular propeller shaft connected to the engine, a propeller on said shaft, and means associated with the propeller shaft to admit the waste water and exhaust gases for discharge abaft the propeller, substantially as described.

44. In a motor oar, the combination of an explosive engine having a water jacket, a tubular propeller shaft connected to the engine, a propeller on said shaft, and a casing providing a chamber adapted to receive the waste water and exhaust gases from the engine, said propeller shaft having apertures in the sides thereof adapted to admit the waste water and exhaust gases from said chamber for discharge abaft the propeller to prevent cavitation thereat, substantially as described.

45. In a motor oar, the combination of an explosive engine having a water jacket, a tubular propeller shaft connected to the engine, a propeller on said shaft, and a casing providing a chamber adapted to receive the waste water and exhaust gases from the engine, said propeller shaft having apertures in the sides thereof and formed with beveled edges providing an intake turbine to receive the waste water and exhaust gases from said chamber for discharge abaft the propeller to prevent cavitation thereat, substantially as described.

46. In a motor oar, the combination of an explosive engine, a tubular propeller shaft connected to the engine, a propeller on said shaft, and a casing providing a chamber adapted to receive the exhaust gases from the engine, said propeller shaft having apertures in the sides thereof adapted to admit the exhaust gases from said chamber for discharge abaft the propeller to prevent cavitation thereat, substantially as described.

47. In a motor oar, the combination of an explosive engine, a tubular propeller shaft connected to the engine, a propeller on said shaft, and a casing providing a chamber adapted to receive the exhaust gases from the engine, said propeller shaft having apertures in the sides thereof and formed with beveled edges providing an intake turbine to receive the exhaust gases from said chamber for discharge abaft the propeller to prevent cavitation, thereat, substantially as described.

48. The combination with a boat of a motor oar therefor comprising a support mounted on the boat; a yoke swiveled on said support; a motor having horizontal trunnions journaled on said yoke; a spring for placing uniform friction on said trunnions and for absorbing the vibration of the engine; a device for securing said trunnions in different set positions; a propeller shaft connected to the motor; and a propeller on said shaft, substantially as described.

49. The combination with a boat of a motor oar therefor comprising a support mounted on the boat; a yoke swiveled on said support; a spring for placing uniform friction on the yoke swivel and for absorbing the vibration of the engine; a device for securing the yoke swivel in different set positions; a motor having horizontal trunnions journaled on said yoke; a device for securing said trunnions in different set positions; a propeller shaft connected to the motor; and a propeller on said shaft, substantially as described.

50. The combination with a boat of a motor oar therefor comprising a bracket secured to the boat; an arm hingedly mounted on said bracket; a spring on said hinged mount for placing uniform friction on said bracket arm and for absorbing the vibration of the engine; a universal support mounted on said bracket arm; a motor mounted on said support; a propeller shaft connected to the motor; and a propeller on said shaft; substantially as described.

In testimony whereof, I affix my signature, in presence of two witnesses.

WILLIAM BARNUM COWLES.

Witnesses:
P. R. LONG,
FRANCES B. LONG.